US011468322B2

(12) United States Patent
Shafto et al.

(10) Patent No.: US 11,468,322 B2
(45) Date of Patent: Oct. 11, 2022

(54) METHOD FOR SELECTING AND PRESENTING EXAMPLES TO EXPLAIN DECISIONS OF ALGORITHMS

(71) Applicant: Rutgers, The State University of New Jersey, New Brunswick, NJ (US)

(72) Inventors: Patrick Shafto, Newark, NJ (US); Scott Cheng-Hsin Yang, Kearny, NJ (US); Wai Keen Vong, New York, NY (US); Ravi Sojitra, Colonia, NJ (US)

(73) Assignee: Rutgers, The State University of New Jersey, New Brunswick, NJ (US)

( * ) Notice: Subject to any disclaimer, the term of this patent is extended or adjusted under 35 U.S.C. 154(b) by 498 days.

(21) Appl. No.: 16/697,870

(22) Filed: Nov. 27, 2019

(65) Prior Publication Data
US 2020/0175367 A1   Jun. 4, 2020

Related U.S. Application Data

(60) Provisional application No. 62/774,976, filed on Dec. 4, 2018.

(51) Int. Cl.
*G06N 3/08* (2006.01)
*G06N 3/04* (2006.01)
(Continued)

(52) U.S. Cl.
CPC .............. *G06N 3/08* (2013.01); *G05D 1/0088* (2013.01); *G06N 3/04* (2013.01); *G05D 2201/0213* (2013.01); *G06Q 40/025* (2013.01)

(58) Field of Classification Search
CPC .......... G06N 3/08; G06N 3/04; G05D 1/0088; G05D 2201/0213; G06Q 40/025
(Continued)

(56) References Cited

U.S. PATENT DOCUMENTS 5,251,131 A * 10/1993 Masand ............... G06K 9/6276
  704/9
9,767,410 B1 * 9/2017 Guevara ................ G10L 15/16
(Continued)

FOREIGN PATENT DOCUMENTS

WO   WO-2004063831 A2 *  7/2004  ........... G06N 3/0454

OTHER PUBLICATIONS

Apte et al., Data-intensive analytics for predictive modeling, IBM Journal of Research and Development 47.1: 17-23, Inernational Business Machines, January (Year: 2003).*
(Continued)

*Primary Examiner* — Frantzy Poinvil
(74) *Attorney, Agent, or Firm* — Lerner, David, Littenberg, Krumholz & Mentlik, LLP

(57) ABSTRACT

A method of generating a set of examples for explaining decisions made by a machine learning program, involving receiving a set of training data for training the program, and for given subsets of the training data, determining each of (a) a probability of a user correctly inferring a future decision of the program after observing the respective decisions of the program for the given subset of the training data, (b) a suitability of a size of the given subset, and (c) an average probability of the user correctly inferring a future decision of the program after observing the respective decisions of the program for an unspecified subset of the training data. The determinations (a), (b) and (c) are used to score each of the given subsets of training data, and a subset of training data is selected as the generated set of examples based on the scores.

20 Claims, 3 Drawing Sheets

(51) Int. Cl.
*G05D 1/00* (2006.01)
*G06Q 40/02* (2012.01)

(58) Field of Classification Search
USPC .......................................... 705/3–44; 706/21
See application file for complete search history.

(56) References Cited

U.S. PATENT DOCUMENTS

| | | | | |
|---|---|---|---|---|
| 2006/0212386 | A1* | 9/2006 | Willey | G06Q 40/02 705/38 |
| 2006/0253274 | A1* | 11/2006 | Miller | G06F 40/295 704/9 |
| 2008/0301059 | A1* | 12/2008 | Ramsey | G06Q 40/00 705/36 R |
| 2011/0055112 | A1* | 3/2011 | Haines | G06Q 40/06 705/36 R |
| 2012/0087547 | A1* | 4/2012 | He | G06K 9/629 382/110 |
| 2014/0039983 | A1* | 2/2014 | Vinson | G06N 20/00 705/7.36 |
| 2020/0379454 | A1* | 12/2020 | Trinh | G06N 3/088 |

OTHER PUBLICATIONS

Ravi Sojitra, "Bayesian Teaching as Model Explanation: An MNIST Example," https://ravisoji.com/2018/03/04/bayesian-teaching-as-explanation.html; Mar. 4, 2018, pp. 1-6.

Vong et al., "Bayesian Teaching of Image Categories," COGSCI 2018 (Jul. 2018), 6 pages.

Yang et al., "Explainable Artificial Intelligence via Bayesian Teaching," 31st Conference on Neural Information Processing Systems (NIPS 2017) Dec. 4, 2017, Long Beach, CA, USA, 1 page poster.

Yang et al., "Explainable Artificial Intelligence via Bayesian Teaching," 31st Conference on Neural Information Processing Systems (NIPS 2017), Dec. 4, 2017, Long Beach, CA, USA, pp. 1-11.

Yang, S.C. et al., "Optimal Cooperative Inference," Department of Mathematics & Computer Science, Rutgers University, May 2017, pp. 1-14.

* cited by examiner

METHOD FOR SELECTING AND PRESENTING EXAMPLES TO EXPLAIN DECISIONS OF ALGORITHMS

CROSS-REFERENCE TO RELATED APPLICATION

The present application claims the benefit of the filing date of U.S. Provisional Patent Application No. 62/774,976 filed Dec. 4, 2018, the disclosure of which is hereby incorporated herein by reference.

STATEMENT REGARDING FEDERALLY SPONSORED RESEARCH OR DEVELOPMENT

This invention was made with government support under Agreement No. SMA-1640816 awarded by the National Science Foundation, and Agreement No. FA8750-17-2-0146 awarded by the Defense Advanced Research Projects Agency. Therefore, the government may have certain rights in the invention.

BACKGROUND OF THE INVENTION

Improvements in machine learning programs have given way to a multitude of autonomous and semi-autonomous systems that receive inputs and make decisions fully or partially own their own. Furthermore, these autonomous and semi-autonomous systems have grown in complexity over time. As a result, the systems having become increasingly more accurate at making correct decisions, but at the same time it has become increasing harder to understand the systems' decision-making processes. The inability to understand machine learning-based decisions can create a lack of trust between users and the automated systems, which in turn may discourage users from using the systems in the first place. The inability to understand these decisions also makes it more difficult to correct the systems when errors are made, since it is difficult to understand why the error was made in the first place.

Many systems can be analyzed by feeding a set of inputs into the system's algorithm and studying the output. Over a long enough time, it may be possible to gain some understanding of how the decision making process works. However, this process is inefficient, since it could take a very long time and a great number of examples to process enough information to understand a given system. Furthermore, the amount of time and examples needed to gain an understanding may vary greatly from system to system, depending on each system's relative complexity and further depending on the relative complexity of the environment to which the system is applied. Yet further, in many systems, such as those that use non-probabilistic learning models, it may be difficult or even impossible to directly interpret the system's decision making process based in an example-to-outcome format.

BRIEF SUMMARY OF THE INVENTION

One aspect of the disclosure is directed to a method of generating a set of examples for explaining a decision made by a machine learning program. The method may involve receiving, by one or more processors, a set of training data for training the machine learning program, and for a plurality of given subsets of the training data, determining, by the one or more processors, each of (a) a probability of a user correctly inferring a future decision of the machine learning program after observing the respective decisions of the machine learning program for the given subset of the training data (e.g., based on approximate Bayesian inference) (b) a suitability of a size of the given subset (e.g., based on one or more predefined inputs indicating a desired size of the set of examples); and (c) an average probability of the user correctly inferring a future decision of the machine learning program after observing the respective decisions of the machine learning program for an unspecified subset of the training data (e.g., based on approximate Bayesian inference).

The method may further involve determining, by the one or more processors, a score for each of the plurality of given subsets of training data based on each of the determinations (a), (b) and (c). The score may indicate a likelihood of selecting the given subset of training data as the set of examples. The method may further involve outputting a selected subset of training data as the generated set of examples based on the determined scores of each of the pluralities of given subsets of training data. Outputting the selected subset may further involve presenting the examples to a user (e.g., by text, by visual graphics, or by audio). In some examples the selected subset of training data may be output with at least one of labels or saliency maps to aid a user's understanding of the set of examples.

Another aspect of the disclosure is directed to a system for explaining decisions made by a machine learning program. The system may include each of memory storing a set of training data for training the machine learning program, and one or more processors configured to execute the methods described herein.

In some examples, the generated set of examples may be compliant with European Union General Data Protection Regulations.

In some examples, the machine learning program is one of a supervised learning program, an unsupervised learning program, or a reinforcement learning program, and one or both of the determined probability and average probability may be based on an estimation using at least one of variational inference, expectation propagation, gradient descent, or Monte Carlo analysis. In other examples, the machine learning program may be one of a neural network or a probabilistic deep learning program, and one or both of the determined probability and average probability may be based on a probabilistic interpretation, such as either a probabilistic linear discriminant analysis, Bayesian logistic regression, a softmax decision function, a variational autoencoder.

In some examples, the method may further involve receiving an input indicating a predictor associated with the machine learning program. The predictor may for instance be a manual input from a user, and may be associated with a particular facet of the machine learning program that the user wishes to understand. In such examples, the "future decisions" of the machine learning program for purposes of determining the (a) probability and (c) average probability may be limited to decisions that were influenced by the indicated predictor. In other examples, the "future decisions" of the machine learning program may include any decision for any example processed by the machine learning program. Such decisions may be collectively useful for understanding the machine learning program as a whole.

In some examples, the machine learning program may control a self-driving automobile. In other examples, the machine learning program may control a loan application review.

In some examples, the selected subset of training data may be limited to a predefined maximum number of examples (e.g., 5 or fewer examples). In other examples, the suitability of a size of the given subset may be based on a probability density function, such as a function that tends to favor providing fewer examples (e.g., a probability density function that favors providing five or fewer examples, meaning that an average value of the function is 5 or less).

In some examples of the system, the one or more processors of the system may be configured to both operate the machine learning program and to generate the sets of examples for explaining decisions made by the machine learning program.

DETAILED DESCRIPTION

Figure 1:
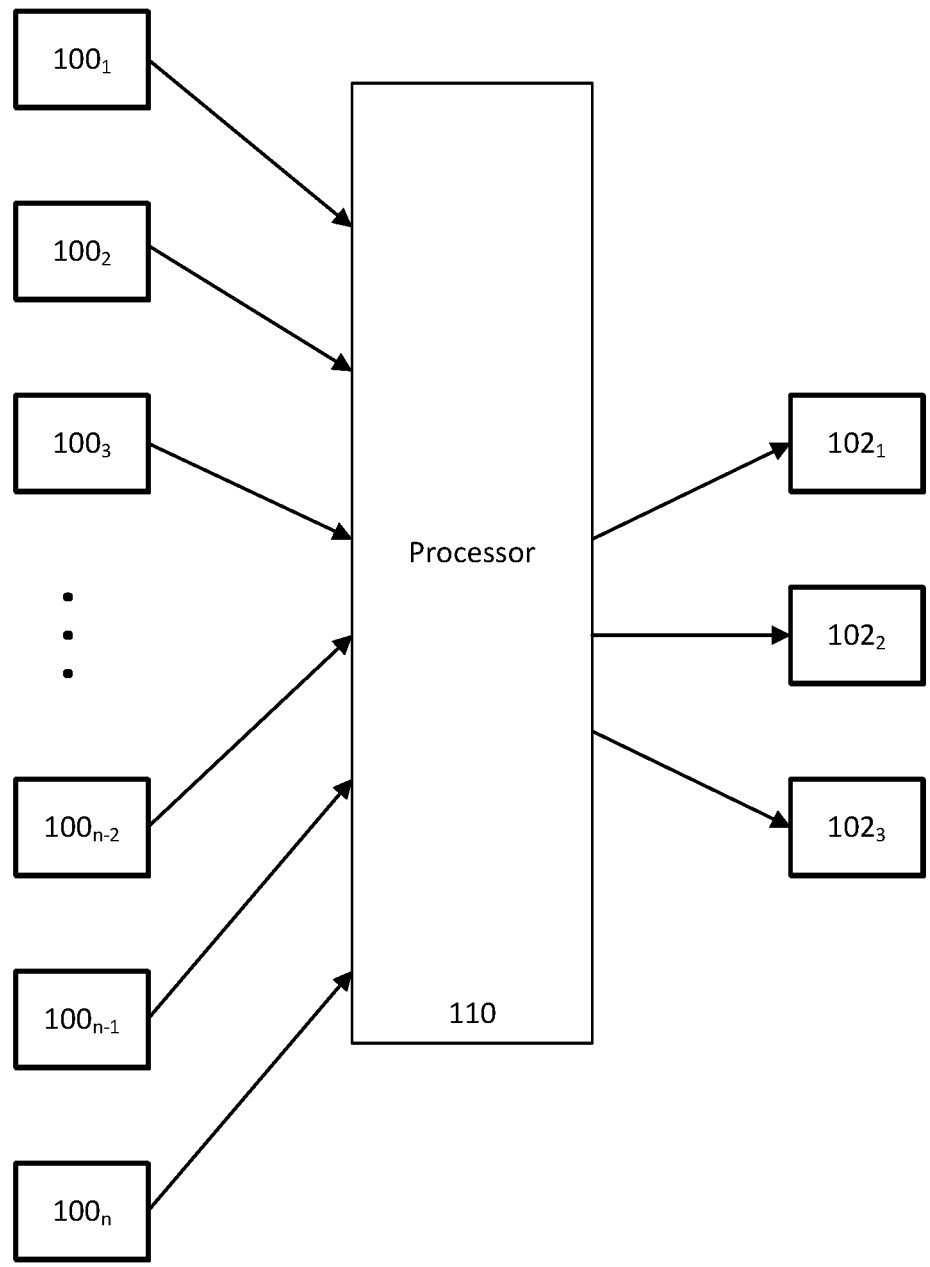
FIG. 1 is an illustration of an application of Bayesian Teaching in accordance with the present disclosure.

The present disclosure relies on an explanation-by-example approach to help users understand the decision making process of a machine learning program. This explanation-by-example approach is referred to as Bayesian Teaching, and is illustrated in FIG. 1. The approach begins with a large pool of data $100_{1-n}$ for which the program's behavior is known, and then selects a small subset $102_{1-3}$ of the large pool of data from which the program's inferences can be taught. The subset $102_{1-3}$ is selected using a processor 110 executing a method, described in greater detail in connection with FIG. 2. The subset may then be stored in memory so that it may be provided to a user, either immediately or at a later time, to explain the decision making process of a machine learning program. Providing the subset $102_{1-3}$ to the user may involve generating an output using any one or combination of text, visual graphics or images, or audio.

Each piece of data of the original pool $100_{1-n}$ and subset $102_{1-3}$ may include one or more factors and a decision made by the machine learning program. For instance, in the case of a program that accepts or denies loan applications, the factors may be the applicant's income, age, occupation, education, credit score, etc., and the decision may be either acceptance or denial. In some examples, the decision may fall along a range of values, such a dollar amount that the applicant is approved to borrow. For further instance, in the case of an autonomous vehicle, the factors may be inputs received at a number of sensors of the vehicle, including but not limited to driver awareness sensors, light sensors, motion sensors, cameras, accelerometers, pressure sensors, signals from an on board console, or any combination thereof, and the decision may be an instruction to direct operation of the vehicle (e.g., accelerate, brake, turn left, turn right, etc.). Stated another way, each piece of data may be considered to represent a scenario and a response of the machine learning program to that scenario.

On the one hand, if it were possible to teach a user every scenario in the data pool $100_{1-n}$, and the program's response to each scenario, one may reasonably expect the user to gain at least a moderate understanding of the program's decision making process. For purposes of the present application, "understanding" a program's decision making processes is defined by the user's ability to correctly infer a future decision made by the machine learning program after being taught. This ability may be defined as a percentage accuracy with which the user correctly guesses what the program will do for any possible set of factors. However, the complete data pool $100_{1-n}$ is regularly far too large to be taught to a user. Given the redundancy inherent in any data pool or training set for a machine learning program, there are diminishing returns for teaching the user an increasing number of scenarios, meaning that the user gains less and less increased understanding of the program from each additional scenario that is taught.

On the other hand, teaching the user only a handful of scenarios, such as three or five scenarios selected at random, may not be sufficient to give the user an understanding of the decision making process (e.g., the user may still not correctly infer a future decision made by the machine learning program with 70% accuracy, or 80% accuracy, or 90% accuracy, with a level of accuracy adequate to meet government requirements for a "right to an explanation), etc.). This may be due to gaps left unexplained by the randomly selected scenarios, or by a lack of overlap between factors applied in the scenarios, whereby a user is left to make uninformed guesses as to which factors lead to which types of decisions.

The present disclosure achieves a balance between the competing interests of teaching a user to understand the machine learning program while providing as few examples to the user as is necessary. This balance is achieved by selecting a subset of the entire data pool that draws high scores both for correctly teaching the user and for being a suitable size for teaching the user. Scores are computed using the following equation:

$$P_T(x \mid \Theta) = \frac{P_L(x \mid \Theta)P(x)}{\int_{x'} P_L(x' \mid \Theta)P(x')dx'} \qquad (1)$$

in which x is a given subset of the data pool, $\Theta$ is the goal (e.g., a user understanding the program), $P_L(x|\Theta)$ is the probability of the user understanding the program after being taught the given subset, $P(x)$ is the likelihood of using a subset the size of the given subset to teach the user (e.g., a suitable of the size of the given subset for efficiently teaching the user), and $\int_{x'} P_L(x'|\Theta)P(x')dx'$ indicates the average or overall probability of the user understanding the program after being taught an unspecified subset of the data pool (e.g., a randomly selected subset of the data pool), or stated another way this term represents an overall ease or difficulty of the program to be understood. It should be appreciated that $\int_{x'} P_L(x'|\Theta)P(x')dx'$ can vary from program to program, since some programs may be generally easier or harder to understand than others. Lastly, $P_T(x|\Theta)$ is the probability of the given subset being selected as the set of examples for teaching the user, or in other words, can be thought of as the score for the given subset. Using the above equation, the subset that scores highest (e.g., equals the highest value) may be chosen as the set of examples to be provided to the user in order for the user to understand the machine learning program.

It should be recognized that the equation factors both whether each given subset is suitably informative ($P_L(x|\Theta)$) and suitably efficient ($P(x)$) in order to reach its score $P_T(x|\Theta)$. As such, the equation achieves the above-noted balance.

Figure 2:
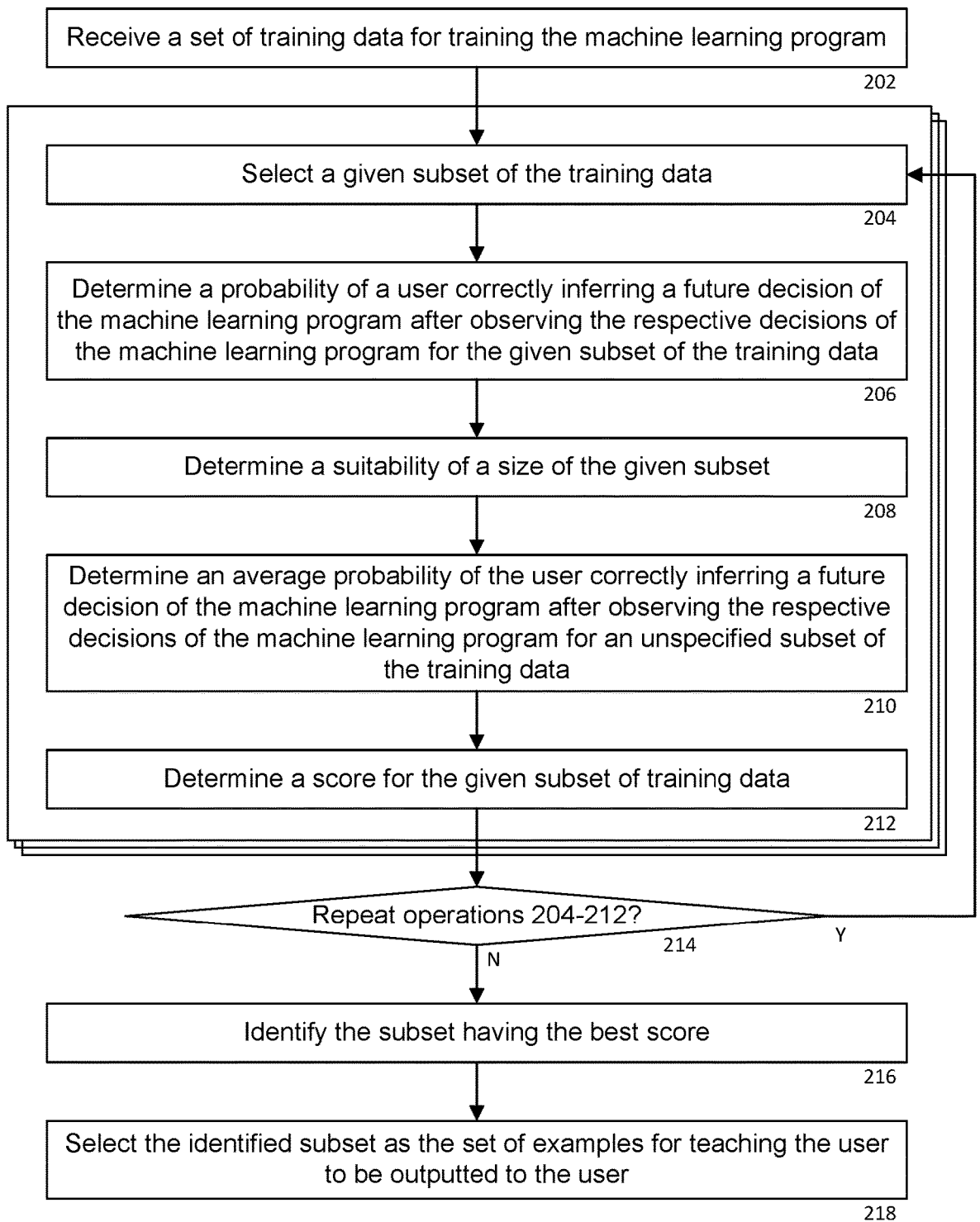
FIG. 2 is a block diagram of a method in accordance with an aspect of the present disclosure.

FIG. 2 shows an example method 200 for generating a set of examples for explaining a decision made by a machine learning program. In the example of FIG. 2, the data pool is generally referred to as a set of "training data," since the data pool is indeed suitable for use as training data on the program, particularly since the program's decision for each example or scenario in the data pool is known. However, for purposes of the present application, it should be recognized that the program need not actually have been trained on the precise set of training data from which the teaching examples are selected. It should also be recognized that the method 200 is meant merely as an example, and that steps in the method can be added, omitted, performed simultaneously or in a different order.

At block 202, a set of training data for training (e.g., capable of being used to train) the machine learning program is received. As noted above, the training data may include a plurality of scenarios, each scenario comprising a set of factors and a decision by the program (e.g., yes/no, a value along a range, an action to be performed). Each scenario may be considered a separate unit or separate example within the set of training data.

At block 204, a given subset of the training data is selected. The given subset is then analyzed using the operations at blocks 206-212.

At block 206, a probability of a user correctly inferring a future decision of the machine learning program after observing the respective decisions of the machine learning program for the given subset of the training data is determined. This determination may correspond to the term $P_L(x|\Theta)$ in the equation above. Since the precise value of this term cannot be empirically determined without actually testing the user, the value is instead estimated. Possible methods of estimation are described in greater detail below.

At block 208, a suitability of a size of the given subset is determined. This determination may correspond to the term $P(x)$ in the equation above. This value may be represented based on a function. In some examples, a step function may be used, whereby subsets greater than a certain threshold value (e.g., 3, 4, 5,) may be assigned a value of 0, and subsets equal or less than the threshold value may be assigned a value of 1. This function assures that the set of examples used to teach the user is limited to a predefined maximum number (e.g., equal to the threshold value). In other examples, a probability density function may be used, whereby subsets of different sizes are assigned a predetermined weight such that the total weight of the function adds up to 1. This function assures that the size of the chosen subset tends towards a number having the greatest density in the function. For instance, if more than 50% of the weight of the function is distributed among values of five examples or less, then the function may favor providing a subset having five or fewer examples to teach the user. In further examples, the function may include both a probability distribution and fixed limits. In this regard, the functions may be considered to indicate an acceptable (or preferred size) of the set of examples, or a size that the set of examples must not be (or preferably should not be), or both.

At block 210, an average probability of the user correctly inferring a future decision of the machine learning program after observing the respective decisions of the machine learning program for an unspecified subset of the training data is determined. This determination may correspond to the term $\int_x P_L(x'|\Theta)P(x')dx'$ in the equation above. Since the precise value of this term cannot be empirically determined without actually testing the user, the value is instead estimated. Methods of estimation for the term $\int_x P_L(x'|\Theta)P(x')dx'$ are also described in greater detail below. It should be understood that the methods used to determine $P_L(x|\Theta)$ can similarly be used to determine $\int_x P_L(x'|\Theta)P(x')dx'$.

At block 212, a score for the given subset of training data may be determined. The determination may be based on each of the determined probability (block 206), the determined suitability (block 208) and the determined average probability (210). For instance, the equation shown above may be used. In other examples, similar equations relying on comparable principles of Bayesian teaching may be employed.

Operations at blocks 204-212 may be repeated for a plurality of subsets until a subset having a maximum score is determined. In some examples, operations may be repeated using an exhaustive search function, for instance, using a method that iteratively determines a score for every subset of the training data. Alternatively, in some examples, the subsets may be evaluated using a non-exhaustive search function that searches for a maximum value.

At block 214, it may be determined whether to repeat operations 204-212 again. In the case of an exhaustive search, the determination may compare the number of iterations of the operations being carried out to a known number of possible subsets of the training data. In the case of a non-exhaustive search, the determination may be made using any known method for determining when to conclude a non-exhaustive search.

At block 216, the subset (from among the plurality of subsets selected at block 204) having the best score is identified. Using the formula presented above, the best score is the highest score. In other examples, the best score may be a lowest score. More generally, the best score is the score that indicates the highest probability of its corresponding subset being selected as the set of examples for teaching the user.

At block 218, the identified subset is selected as the set of examples for teaching the user. The subset may further be outputted, either directly to the user to teach the user, or to memory so that the examples may be stored until they are later provided to the user, or both.

Outputting the subset may involve providing the set of examples to a user in a visual format (e.g., image, text, etc.), audio format, or combination thereof, depending on the nature of the data and the examples being provided. Additionally, the examples may be labelled, annotated, or otherwise modified in a manner that aids the user's ability to process and understand the data. The types of aids provided with the set of examples may be predetermined.

In some instances, labels may be provided for examples of the data set that have been classified differently by the machine learning program. The labels may aid the user in understanding the different classifications applied to the data set by the machine learning program. Labels may be generated by the machine learning program using conventional methods, such as supervised clustering.

In some instances, saliency maps may be provided with each example of the set of examples. For instance, in the case of an image, the saliency maps may aid the user in understanding what parts (e.g., pixels) of the image were most influential or least influential in a classification process, that is to the machine learning model's inference of what is shown in the image. In order to generate a saliency map, each of a model (e.g., the machine learning program being studied), an inference task (e.g., possible classifications output by the program) and a definition of importance are defined. Taking an image "d" for example, the definition of importance may be a probability that a mask "m" will lead the model to predict the image to be classified in category "y" when the mask is applied to the image. This probability may be expressed as follows:

$$Q_T(m \mid y, d) = \frac{g_L(y \mid d, m)p(m)}{\int_{\Omega_M} g_L(y \mid d, m)p(m)} \quad (2)$$

whereby $g_L(y|d,m)$ is the probability that the model classifies the masked image as y, p(m) is the prior probability distribution of m, and $\Omega_M = [0,1]^{W \times H}$ is the space of all possible masks that may be applied to an image W pixels wide by H pixels high. Optionally, an expected saliency map can be determined using Monte Carlo integration using a limited number of samples from the prior probability distribution p(m) and taking a weighted average of the samples by using their $Q_T$ values to assign weights.

Although saliency maps are commonly natural images, similar mappings may be provided to the user in other contexts to explain other types of categorized data. For example, similar ideas may be applied to text by highlighting specific portions of text (e.g., words, keywords) that are most influential to a categorization.

Figure 3:
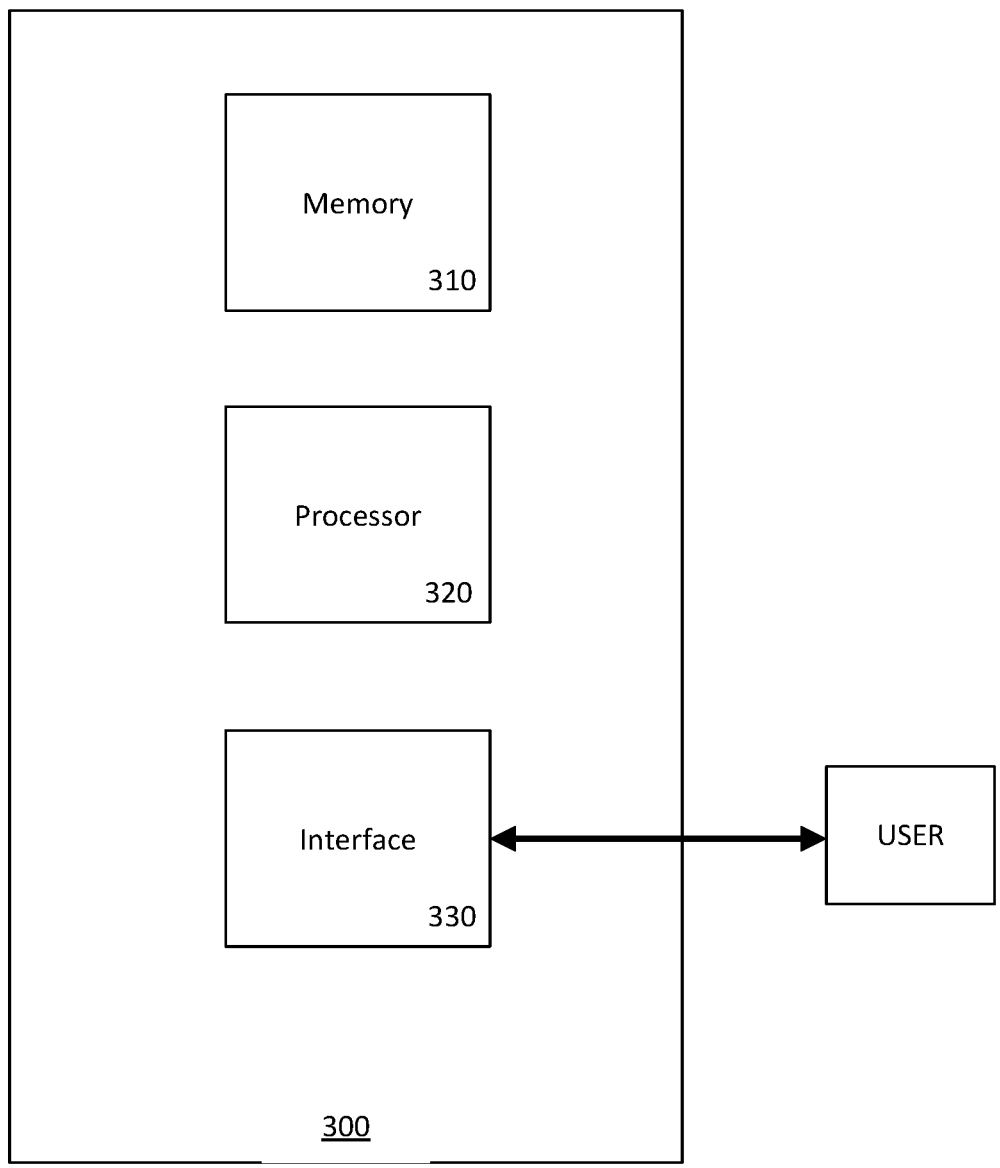
FIG. 3 is a block diagram of a system and user in accordance with an aspect of the present disclosure.

The above methods can be implemented on a processing system, such as the example system 300 shown in FIG. 3. The system 300 includes memory 310 storing a set of training data that may be received by the machine learning program and on which the machine learning program may be trained. The system 300 further includes a processor 320 capable of and configured to access the memory 310. The memory may further include instructions that may be executed by the processor 320, such as instructions for executing a method in accordance with the present disclosure (e.g., method 200). Although FIG. 3 functionally illustrates the memory 310 and processor 320 as being within the same block, the memory 310 and processor 320 may actually include multiple memories and processors that may or may not be stored within the same physical housing. For example, data can be stored in a location physically remote from, yet still accessible by, the processor 320. Similarly, the processor 320 can actually include a collection of processors, which may or may not operate in parallel.

In some examples, the system may be implemented as part of the machine learning program or a device controlled by the machine learning program. Integration of the machine learning program and the teaching methods of the present disclosure can be used to provide real-time explanations to the user in order to explain the program's decision making process.

For instance, in the case of a loan application review program, the program itself may be confirmed to provide both a decision on the user's application (e.g., acceptance or denial, an amount of money agreed to be lent, etc.) as well as a set of examples so that the user may understand how the decision making process of the program. In some instances, whether a set of examples is provided to the user may be based on the decision outputted by the program (e.g., provide the set of examples only if the application is denied, if the amount of the loan is less than what the user requested, etc.).

For further instance, in the case of an autonomous vehicle, the vehicle may be programmed with each of an autonomous driving program and a separate program for selecting examples so that a passenger of the vehicle can understand the autonomous driving program. In this regard, the passenger may be able to provide an input to the vehicle system requesting an explanation for how the system made a particular decision (e.g., turning, accelerating, not turning, not accelerating, etc.) The system may provide examples demonstrating why the particular decision in question was made.

In this regard, also shown in FIG. 3 is an interface 330 for interfacing with a user (USER) that may have interest in interacting with the system 300. Interaction with the system may be unidirectional or bidirectional. In some examples, the system 300 may be capable of receiving one or more inputs from the user, such as an inquiry regarding a decision made by the system, and generating a set of examples for answering the user's inquiry in response thereto. The generated set may then either be stored to be later provided to the user or to users with similar questions, provided to the user in real time in response to the inquiry or both. Similarly, in some examples, the system may be capable of outputting or transmitting to the user a set of examples explaining a decision made by the system, either in response to a user inquiry or even without being prompted by a user inquiry.

As noted above, the above described methods rely on estimations and approximations of certain values for determining whether a user will understand a machine learning program from being taught a set of examples. These estimations may use tools adapted from approximate Bayesian inference, such as variational inference, or expectation propagation, gradient descent, or analytic methods combined with (Markov Chain) Monte Carlo when feasible.

More specifically, the type of approximate Bayesian inference applied may depend on the type of machine learning model that the method is being used to explain. For purposes of the present disclosure, machine learning models can be broken down into four distinct categories: supervised learning; unsupervised learning; reinforcement leaning; and deep learning.

In the case of supervised learning, the given subset being evaluated x may be a subset of examples or labels (e.g., factors), and the goal $\Theta$ can be characterized in terms of understanding the weights that dictate the shape of the regression function (or classification boundary) in the program. Variational inference and/or expectation propagation can be used for these models. These approaches may be used in, for instance, a loan application setting. Depending on the particular setting, the factors may be applied linearly or non-linearly. In either case, the particular factors that influence a given outcome can be explained using a sample of examples from the program.

In the case of unsupervised learning, the given subset being evaluated x may still be the examples, and the goal $\Theta$ can be characterized in terms of understanding latent structures in the program. Variational inference and/or expectation propagation can also be used for these models.

In the case of reinforcement learning, the given subset x may be taken from the history of observed actions or states and their respective consequences (e.g., rewards experienced), and the goal $\Theta$ can be characterized in terms of understanding the policies that govern the model.

In the case of deep learning, the given subset x may again be the examples, and the goal $\Theta$ can be characterized in terms of understanding the weights of the deep network. In For standard deep learning approaches, examples can be generated based on the latent space learned by the model, for instance using a softmax decision function (e.g., often a last layer of the model) a probabilistic linear discriminant analysis, Bayesian logistic regression, or combination thereof. By contrast, in the case of probabilistic inference methods, such as probabilistic deep learning methods, such as Deep Gaussian Processes, variational inference and/or Expectation propagation (like those for supervised and unsupervised learning methods) may be applied.

Among these categories, some machine leaning programs may be characterized as Bayesian (e.g., Mondiran forests for supervised learning, Markov-decision processes for reinforcement learning, neural networks and deep Gaussian processes trained in a Bayesian way, etc.), while other programs may be categorized as non-Bayesian (e.g., random forests for supervised learning, probabilistic matrix factorization for unsupervised learning, temporal difference for reinforcement learning, etc.). The present disclosure can be applied to both Bayesian and non-Bayesian programs in order to determine a set of examples, regardless of whether the models on which these programs are built are probabilistic or non-probabilistic, linear or non-linear.

When $P_L(x|\Theta)$ can be determined using analytic methods, Monte Carlo methods can be used to compute the term $\int_x P_L(x'|\Theta)P(x')dx'$.

However, for fully probabilistic models, it may not be possible to choose models that introduce analytic inference. In such cases, variational inference, expectation propagation, or a combination thereof, may be introduced to approximate the distribution over example sets. These approximation methods can be used to estimate or approximate a posterior distribution.

Further, for non-probabilistic models, the model may be altered or augmented to simplify the interpretation of the model. Take for example image classification, which can be performed using convolutional neural networks, and elaborated methods such as Generative Adversarial Networks, or GANS. These networks and models are non-probabilistic and predict labels using complex, non-linear transformations of the data to which there are no direct probabilistic models. In such an example, the non-probabilistic model may be augmented to include a layer that has a probabilistic interpretation. The augmented layer may be configured to allow for analytic solutions. One such layer may be a probabilistic linear discriminant analysis (pLDA) layer. Given the learned features of the neural network, the parameters for pLDA can effectively be re-learned, and those parameters can then be used as the basis for selecting examples that explain the neural network. Another such layer may be a Bayesian logistic regression layer. Given the learned features of the neural network, the parameters for Bayesian logistic regression can effectively be learned, and those parameters can similarly be used as a basis for selecting examples that explain the neural network Although using a probabilistic model that is not the original decision function may result in degraded prediction performance, it has been found that the use of an augmented layer based on a probabilistic model to determine the set of examples can nonetheless be useful for teaching a user to understand the non-probabilistic model. Still, better prediction performance, and better model explanations, can be achieved by minimizing the amount of changes made to the original decision function. Therefore, if the model already uses a softmax decision function, it may be preferable that this function be directly used as a probabilistic model to generate the set of examples. Similarly, if the model already uses variational autoencoders, then this can be directly leveraged to generate the set of examples based on their probabilistic interpretations. In the case of a neural network, the features of neural network most greatly influence the program's decision can be identified. Then, using an auto-encoder, examples that are influenced by those identified features (or that are most greatly influenced by the identified features) can be selected.

The above examples generally describe teaching a user to understand a machine learning program. However, what the user desires to learn about the program can vary from case to case. In some instances, the user may want a complete understanding of the program, whereby the user can accurately predict the program's decision for any situation. In other instances, the user may only require a partial understanding of the program, whereby the user can accurately predict the program's decision for any situation that is influence by a particular factor or label that interests the user. To illustrate, in the case of a user that is rejected for a bank loan, the user does not need to understand the entire loan application decision algorithm, but rather only why the factors in the user's particular case led to a rejection. In this regard, the method may first involve identifying a factor or label associated with the user's rejection (or more generally, a factor or label that interests the user), and then return a set of examples that demonstrates the influence of that particular factor or label of the program. In a similar vein, the factor or label can be identified by manual input by the user, such as a directed question asked from the user to the system operating the program.

Additionally, many of the examples discussed above have been described in the context of loan applications and autonomous vehicles. However, it should be appreciated by those skilled in the art that the methods and systems of the present disclosure can further be applied many other technologies, including but not limited to the judicial system (e.g., estimation of recidivism, setting bail, etc.), human resources systems (e.g., resume review, matching of candidates with positions, etc.), predicting risks of default for mortgages, and so on. The methods and systems may further be of interest in areas where discrimination (e.g., based on race, based on ethnicity, based on religion) is a concern.

These applications are of particular interest due to the recent passage of legislature that, among other things, gives individuals a right to an explanation for decisions made by algorithms. For instance, in Europe, the European Union General Data Protection Regulation (GDPR) creates a compliance requirement for artificial intelligence algorithms to be explainable to individuals affected by the algorithms. In this regard, the methods and systems of the present disclosure provide a way of complying with the EU regulation, as well as with other future "Explainable AI" regulations.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method of generating a set of examples for explaining a decision made by a machine learning program, the method comprising:

receiving, by one or more processors, a set of training data for training the machine learning program;

for each given subset of the training data:

(a) determining, by the one or more processors, a probability of a user correctly inferring a future decision of the machine learning program after observing the respective decisions of the machine learning program for the given subset of the training data, the determination being made based on approximate Bayesian inference;

(b) determining, by the one or more processors, a suitability of a size of the given subset based on one or more predefined inputs indicating a desired size of the set of examples;

(c) determining, by the one or more processors, an average probability of the user correctly inferring a future decision of the machine learning program after observing the respective decisions of the machine learning program for an unspecified subset of the training data, the determination being made based on approximate Bayesian inference; and (d) determining, by the one or more processors, a score for the given subset of training data based on each of the determined probability (a), the determined suitability (b) and the determined average probability (c), the score indicating a likelihood of selecting the given subset of training data as the set of examples; and outputting a selected subset of training data as the generated set of examples based on the determined scores of each given subset of training data.

2. The method of claim 1, wherein the generated set of examples is compliant with European Union General Data Protection Regulation.

3. The method of claim 1, wherein the machine learning program is one of a supervised learning program, an unsupervised learning program, or a reinforcement learning program, and wherein each of: the determined probability (a); and the determined average probability (c), is based on an estimation using at least one of variational inference, expectation propagation, gradient descent, or Monte Carlo analysis.

4. The method of claim 1, wherein the machine learning program is one of a neural network or a probabilistic deep learning program, and wherein each of: the determined probability (a); and the determined average probability (c), is based on a probabilistic interpretation.

5. The method of claim 4, wherein the probabilistic interpretation is a probabilistic linear discriminant analysis.

6. The method of claim 4, wherein the probabilistic interpretation is a Bayesian logistic regression.

7. The method of claim 4, wherein the probabilistic interpretation is a softmax decision function.

8. The method of claim 4, wherein the probabilistic interpretation is a variational autoencoder.

9. The method of claim 1, further comprising receiving an input indicating a predictor associated with the machine learning program, wherein the future decision of the machine learning program is a decision that is influenced by the predictor.

10. The method of claim 1, wherein the future decision of the machine learning program is a decision for any example processed by the machine learning program.

11. The method of claim 1, wherein outputting a selected subset of training data as the generated set of examples further comprises outputting at least one of labels or saliency maps to aid understanding the set of examples.

12. A system for explaining decisions made by a machine learning program, the system comprising:

memory storing a set of training data for training the machine learning program; and a processor configured to:
for a plurality of subsets of the training data:
(a) determine a probability of a user correctly inferring a future decision of the machine learning program after observing the respective decisions of the machine learning program for the given subset of the training data, the determination being made based on approximate Bayesian inference;

(b) determine a suitability of a size of the given subset based on one or more predefined inputs indicating a desired size of the set of examples;

(c) determine an average probability of the user correctly inferring a future decision of the machine learning program after observing the respective decisions of the machine learning program for an unspecified subset of the training data, the determination being made based on approximate Bayesian inference; and (d) determine a score for the given subset of training data based on each of the determined probability (a), the determined suitability (b) and the determined average probability (c), the score indicating a likelihood of selecting the given subset of training data as the set of examples; and output a selected subset of training data for explaining decisions made by the machine learning program based on the determined scores of each of the plurality of given subsets of training data.

13. The method of claim 12, wherein the generated set of examples is compliant with European Union General Data Protection Regulation.

14. The system of claim 12, wherein the machine learning program controls a self-driving automobile.

15. The system of claim 12, wherein the machine learning program controls a loan application review.

16. The system of claim 12, wherein the selected subset of training data is limited to a predefined maximum number of examples.

17. The system of claim 16, wherein the predefined maximum number is five or fewer.

18. The system of claim 12, wherein the processor is configured to determine a suitability of a size of the given subset based on a probability density function.

19. The system of claim 18, wherein the probability density function favors providing five or fewer examples.

20. The system of claim 12, wherein the processor is further configured to operate the machine learning program.

* * * * *

UNITED STATES PATENT AND TRADEMARK OFFICE
CERTIFICATE OF CORRECTION

PATENT NO. : 11,468,322 B2
APPLICATION NO. : 16/697870
DATED : October 11, 2022
INVENTOR(S) : Patrick Shafto et al.

It is certified that error appears in the above-identified patent and that said Letters Patent is hereby corrected as shown below:

In the Specification

Column 1, Lines 16-21, "This invention was made with government support under Agreement No. SMA-1640816 awarded by the National Science Foundation, and Agreement No. FA8750-17-2-0146 awarded by the Defense Advanced Research Projects Agency. Therefore, the government may have certain rights in the invention." should read -- This invention was made with government support under grant number 1640816 awarded by the National Science Foundation and grant number FA8750-17-2-0146 awarded by the AFRL/RI. The government has certain rights in the invention. --.

Signed and Sealed this
Fifteenth Day of November, 2022

Katherine Kelly Vidal
*Director of the United States Patent and Trademark Office*